United States Patent Office 3,595,782
Patented July 27, 1971

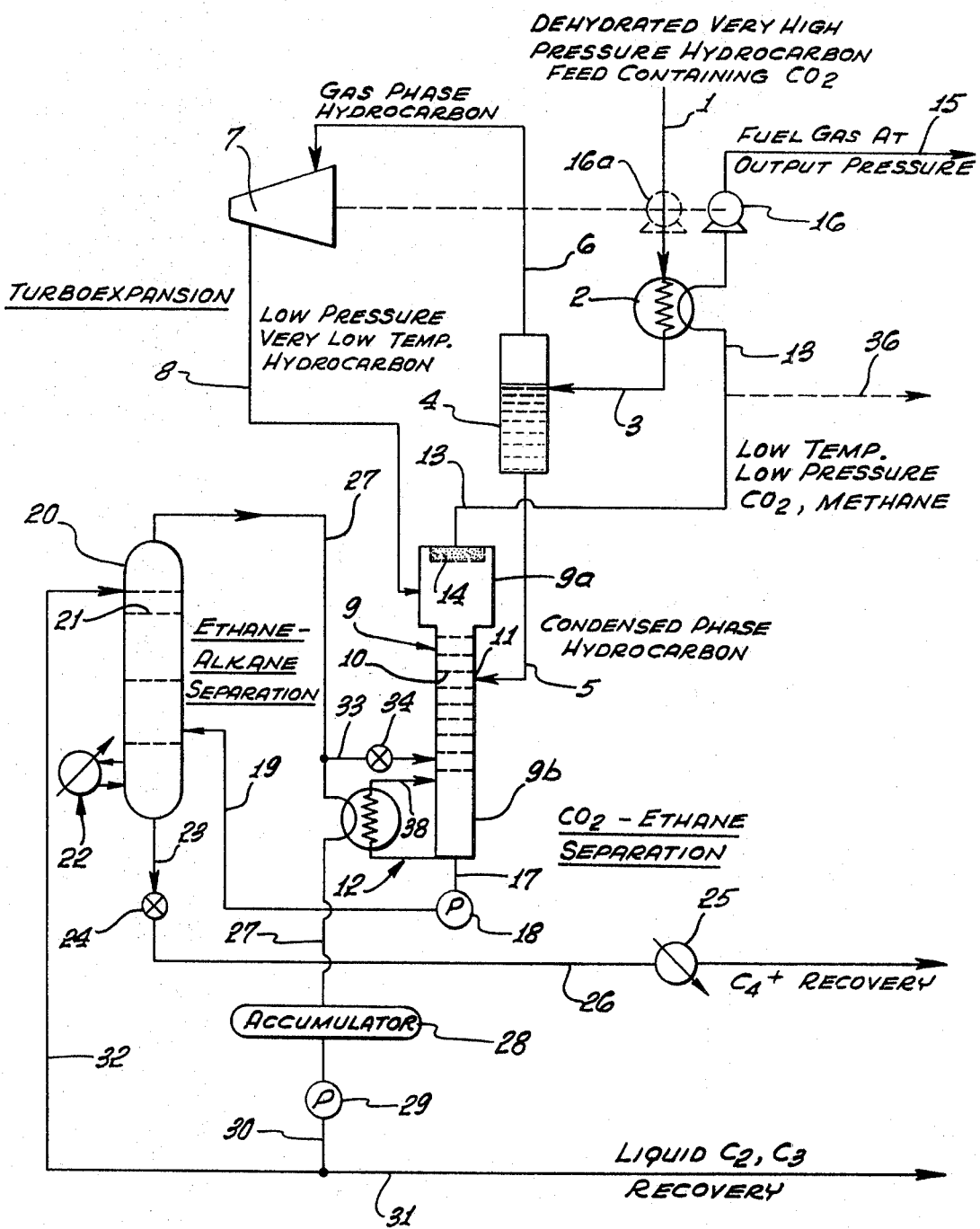

3,595,782
METHOD FOR SEPARATING CARBON DIOXIDE FROM HYDROCARBONS
Robert W. Bucklin, Houston, and Howard Grekel, Claremore, Tex., and Lamar F. Sudduth, Tulsa, Okla., assignors to The Fluor Corporation, Ltd., and Pan American Petroleum Corporation, fractional part interest to each
Filed Dec. 5, 1968, Ser. No. 781,360
Int. Cl. C10g 5/06
U.S. Cl. 208—340    39 Claims

ABSTRACT OF THE DISCLOSURE

High carbon dioxide content e.g. 1–10% carbon dioxide by volume, high pressure hydrocarbon feed gases are processed to liquid ethane essentially free of both methane and carbon dioxide with simultaneous production of low pressure distribution gas comprising methane and carbon dioxide without carbon dioxide icing to foul equipment by turbo-expansion of the precooled feed gas and stripping thereof while maintaining pressures thereon at which nongaseous carbon dioxide remains dissolved in liquid hydrocarbon. Liquefaction of the ethane gas is achieved by heat exchange with stripper bottoms. The process thus achieves maximum conservation of heat and power.

BACKGROUND OF THE INVENTION

(1) Field of the invention

This invention has to do with hydrocarbon processing and more particularly with method and apparatus for handling relatively high carbon dioxide content feed gases to produce liquid ethane output product essentially free of carbon dioxide and to do so without carbon dioxide icing (formation of solid carbon dioxide) within the apparatus. The invention further is concerned with more effective and economical handling of hydrocarbon streams to achieve simultaneously from very high pressure hydrocarbon feed gases, e.g. 300 to 1800 p.s.i.g., lower pressure gases comprised mainly of methane and a separate product comprising ethane or ethane and heavier hydrocarbons.

(2) Prior art

High carbon dioxide content feed gases such as may be encountered in certain fields of the United States which may range in carbon dioxide content between 0.1 and 15% by volume continue to be a problem to the extent that cryogenic handling procedures may cause separation from the feed gas of carbon dioxide as "ice" with destructive effect on equipment and efficiency. Formerly carbon dioxide has been separated in advance of processing for hydrocarbon product separation with an added step such as amine treating, molecular sieve adsorption, methanol absorption or caustic treating or not removed, see for example U.S. Pat. No. 3,292,380 to Bucklin. In cases where the carbon dioxide is not removed from the feed gas it must be removed from the product ethane by one of the above mentioned sweetening processes.

Presently ethane output substantially free of carbon dioxide, e.g. less than 0.1% carbon dioxide content, is in demand.

SUMMARY OF THE INVENTION

It is a major objective of this invention to provide method and apparatus for producing an ethane and heavier hydrocarbon product having a low carbon dioxide content from gas having objectionable amounts of carbon dioxide and to do so in a manner economical of heat and power without carbon dioxide ice fouling of equipment.

Generally speaking, there is provided in accordance with the invention method for obtaining ethane or ethane and heavier hydrocarbon products essentially free of methane and carbon dioxide from hydrocarbon feed gases, typically containing about 0.1 and up to about 15% by volume carbon dioxide, which includes polytropically expanding the feed gas, which may be already precooled e.g. to less than 32° F., through a turbine to lower further the temperature thereof to a value at which methane and carbon dioxide are relatively volatile and separable therefrom, but maintaining pressure and temperature on the expansion products at values inhibiting separation of solid carbon dioxide and permitting separation from said products of carbon dioxide with said methane.

In particular, method is provided for treating high pressure hydrocarbon feed gas containing carbon dioxide to produce products including a liquid or gaseous product comprising liquid or gaseous ethane substantially free of carbon dioxide and a gaseous product at low pressure comprising essentially methane and carbon dioxide which includes (a) expanding a precooled gaseous portion of the feed through a turbine to produce a mixture of gaseous hydrocarbon including methane and liquid hydrocarbon including ethane, the mixture being at a temperature below about −80° F.; (b) passing the mixture to a first separation column at a temperature below about −80° F.; (c) separating methane and carbon dioxide overhead from the first column as gas product, while maintaining nongaseous carbon dioxide dissolved in the liquid hydrocarbon in the first column and turbine and wherever present; (d) passing the ethane-containing liquid hydrocarbon bottoms, substantially free of methane and carbon dioxide, from the first column to a second separation column; (e) separating overhead in the second column a vapor stream containing ethane and liquefying said overhead stream; (f) flowing the methane gas product in heat exchange relation with the feed gas to precool the feed gas; and (g) compressing a gas e.g. at least a portion of the heat exchanged methane gas product and/or the feed gas with the energy output of the turbine.

Solution of nongaseous carbon dioxide in liquid hydrocarbon formed in the precooling step and in the turbine is maintained by providing pressures in this equipment relative to the temperatures therein such that the concentration of nongaseous carbon dioxide present in the liquid does not exceed carbon dioxide solubility in the liquid hydrocarbon and the carbon dioxide remains more volatile than ethane. Suitable pressures are within the range of about 100 to 600 p.s.i.g. and may be less than desired output gas pressures; gas-liquid mixture temperatures may range from about −80° F. to about −180° F.

The method further contemplates treating the feed gas which has been precooled to separate a liquid portion thereof for introduction into the first separation column. In the second column propane may be separated overhead with ethane while butanes and higher hydrocarbons are separated as bottoms.

The second column overhead containing gaseous ethane may be cooled for liquefaction while additional heat is needed for reboiling the bottoms in the first column; thus, in accordance with one feature of the present invention a heat exchange may be effected between the ethane-containing overhead from the second column and liquid from the bottom tray of the first column, the vapor formed from said bottom tray liquid, thus supplying vapor for stripping in the first column and the unvaporized liquid comprising the feed to the second column. Vapor for stripping in the first column may also be provided by introducing overhead vapor from the second column into a lower portion of the first column. A portion of the liquefied ethane-containing overhead is then returned to the upper end of the second column as reflux while a second portion is separated from the system as preferably liquid, ethane-containing product.

Apparatus is provided for carrying out the above method comprising a first column separating carbon dioxide and methane, a second separating column for ethane separation, means passing the bottoms of the first separating column to the second separating column, a gas-driven turbine, means delivering feed gas to the turbine to drive the turbine and to produce expanded, low temperature gas, means delivering this gas to the first separating column, means passing carbon dioxide and methane gas overhead from the first separating column in heat exchanging relation with the feed gas, means liquefying the ethane overhead gas from the second separating column, and a gas compressor driven by the turbine for recompressing at least a portion of the first column overhead gas by the energy output of the turbine.

The ethane overhead liquefying means may include means for heat exchanging the ethane with the bottoms of the first separating column.

The apparatus may further include gas-liquid separating means ahead of the gas-driven turbine to separate gas and liquid components of the precooled gas feed and to pass the liquid portion of the lower end of the first column. The gas compressor may be connected downstream of the feed gas heat exchanging means to compress the feed gas and/or to recompress output product gas.

BRIEF DESCRIPTION OF THE DRAWINGS

The accompanying schematic flow sheet illustrates one embodiment of the present invention.

DESCRIPTION OF THE PREFERRED EMBODIMENTS

It will be apparent from the foregoing, that the present invention provides for carbon dioxide separation from ethane in an integral process step, during which methane is additionally separated rather than by a separate carbon dioxide removal operation such as amine treatment. In addition to the obvious processing and raw material economies thus afforded, the process herein disclosed effectively uses heat relationships of various process streams to minimize or eliminate external refrigeration and other power requirements. For example the relatively warm ethane-containing overhead from the second column is cooled for liquefaction by heat exchange to satisfy the heat requirement of the first column. In addition the feed gas which is desirably procooled in advance of the gas turbine is cooled with obtained gas product, principally methane and generally at low pressures.

With reference to the accompanying flow sheet high pressure feed gas, containing methane, carbon dioxide, ethane and higher hydrocarbons, from a natural or some processing source and at a pressure typically above about 300 p.s.i.g. and up to 1800 p.s.i.g. is introduced by means of line 1 in a dehydrated condition from a previous conventional dehydrating step (not shown), and having a water dew point temperature below the feed temperature to column 9. The dehydrated feed gas flows through one or more heat exchangers 2 which serve to precool the gas by heat transference to the later described cold stripped gas in line 13 going to compressor 16 from column 9. Hydrate formation which may occur if water vapor is inadvertently present in the feed gas may be conventionally prevented by introduction of a lower alkanol such as methanol, ethanol or propanol to the feed gas in advance of rapid cooling thereof and is not shown. From heat exchanger 2 the precooled high pressure gas and some condensate is discharged through line 3 to a gas-liquid separator tank 4, of a type suitable to permit phase separation of the cooled hydrocarbons. Condensate or liquid hydrocarbon is drawn off in line 5 for introduction to column 9 at feed point 11.

The high pressure precooled hydrocarbon gas phase from separator 4 passes through line 6, e.g. at a temperature below 32° F. to a gas-driven turbine 7, capable of tolerating condensate such as may result from cooling by expansion of the gas from line 6 in passing through and driving the turbine 7 to a relatively low discharge pressure, e.g. 200 p.s.i.g., and cold temperature (below about −100° F.) in line 8.

The turbine gaseous and condensed phase effluent mixture in line 8 may be divided into a vapor and a condensate portion in a suitable separator and the condensate portion stripped by methods and apparatus capable of depleting the condensate of carbon dioxide. Methane and lighter ends are removed with the carbon dioxide. In preferred practice, the line 8 stream is introduced into the top section 9a of a vertically extended stripping column 9 which typically may contain suitable means such as conventional plates or trays 10 for intimately contacting downflowing condensate with rising vapors from the secondary feed point 11 in column 9 at which line 5 introduces condensate from gas-liquid separator 4. Bottom reboiler 12 adds heat to the column via vapor obtained by heat exchange with the overhead from column 20 conveyed through line 27.

As depicted, the first separating column 9 is operated to remove in the top tray vapors substantially all of the carbon dioxide (and methane) content of the feed gas as well as a minimal portion of the ethane along line 13. The relative volatility of carbon dioxide to ethane is preferably greater than 1.0 and may be 1.1 or 1.3 and higher, depending on temperature and pressure conditions. In general the column section 9a is operated to maintain a temperature at the lower end of a temperature range between −80° F. and −180° F. e.g. −157° F. and a pressure in the range of 100 p.s.i. to 600 p.s.i.

Temperature-pressure relationships in both turbine 7 and column 9 are controlled such that the hydrocarbon liquid present will dissolve the nongaseous carbon dioxide present, whereby separation of solid carbon dioxide is avoided with attendant icing problems which can overload the turbine and cause bearing failure or even plug column 9.

In the particular embodiment illustrated, the upper section 9a of column 9 is provided with a coalescing mesh 14 to remove and return to the column any liquid entrained with the top tray vapors. Beyond the heat exchanger the product gases in line 13, or at least a portion thereof, are compressed in compressor 16 to some desired pressure ordinarily greater than the pressure in column 9 at which they were stripped from the gas feed. A portion of the gas in line 13 may be drawn off through line 36 without recompression. The compressor 16 is driven by the turbine 7 as schematically indicated, thus utilizing the energy output of the turbine. Additionally or alternatively compressor 16a shown in phantom outline across feed line 1 may be used to compress the feed gas.

The ethane-containing liquid obtained in column 9 as the bottoms which may also contain propane and heavier hydrocarbons is passed in line 17 from the lower section 9b of the column 9 to be transferred by pump 18 through line 19 to feed a midpoint of the second separating column 20. Column 20 may be a vertically extended fractionation column containing suitable means such as conventional plates or trays 21 for intimately contacting down-flowing condensate with vapors rising from the bottom reboiler 22.

The isobutane and higher boiling hydrocarbons are removed from the second separating column through line 23 having valve 24 for level control through line 26 to cooler 25 and to storage or other purposes, e.g. for fractionation into gasoline or isobutane fractions.

Overhead vapors from column 20 comprising ethane and propane are passed through line 27 via heat exchanger 12, where vapors are condensed, to accumulator 28 from which these products are drawn by pump 29 via line 30 and then to liquid product delivery in line 31 or to reflux through line 32 which reintroduces these products at the top of column 20.

Liquefaction of the overhead gases from column 20 without external refrigeration is a signal feature of the present invention. This is accomplished by passing the gases in heat exchange relation with the bottoms from column 9 in reboiler 12. Thus heat exchanger 12 serves a dual function as a condenser and a reboiler. The vapors from the reboiler side of heat exchanger 12 flow along line 38 into the column lower section 9b. The ethane-propane liquids from the condenser side of heat exchanger 12 flow along line 27 to accumulator 28 and recovery or recycle. Thus as shown, the second column liquid overhead flows from the accumulator 28 through line 30 to a combined reflux and product pump 29. The reflux flows from pump 29 through line 32 to the top tray in the column 20. The net liquid overhead product comprising combined ethane and propane, flows from line 30 through line 31 to storage or loading, or subsequent fractionation.

The pressure selected to operate column 20 must be high enough so that the condensed reflux temperature from accumulator 28 is at least 10 to 20° F. higher than the liquid and vapor flowing in reboiler 12. In a typical instance the column 9 bottoms liquid in line 17 is at a temperature of about 27° F. and at a pressure of about 200 p.s.i.g., while the ethane-propane reflux and production in line 30 is at 45° F. and 280 p.s.i.g. In order to prevent the temperature of the column 9 bottoms liquid from converging on the column 20 overhead temperature in case of unfavorable variations of feed gas composition and/or a reduced demand for ethane in the ethane-propane product, a variable recycle of a portion of the overhead vapor of the column 20 to the bottom of the column 9 is provided from line 27 through line 33 to column 9. The degree of recycle is controlled by valve 34 in line 33. The integrity of the heat pump represented by condenser reboiler 12 can thus be assured through a wide range of operating conditions and assure the practicality of this refrigeration and heat conservation device. In effect, the heat put in reboiler 22 is reused in reboiler 12, while reboiler 12 provides necessary refrigeration to reflux column 20 as well as condense the overhead product of this column.

With reference to the gas turbine operation, the quantity and pressure differential of the feed gas at the high pressure line 6 and the low pressure line 8 sides of the turbine 7, are such that expansion energy imparted to the turbine will drive compressor 16 and compress the line 13 gas to a discharge pressure in line 15 as desired. In general, the operating pressure of column 9 and the pressure in line 13 may be about 30 p.s.i.g. or more below the gas outlet pressure in line 15, and the feed gas quantity and pressure differential across the turbine 7 will satisfy the energy requirements of compressor 16 to elevate the portion of the column 9 overhead to the desired product line 15 pressure.

To cite typical operating conditions for the line 1 dehydrated feed gas at a pressure of 610 p.s.i.g. and temperature of 80° F., containing about 94% methane, 0.8% carbon dioxide, 3.7% ethane and 1.5% propane and heavier hydrocarbons, the chilled feed gas stream enters separator 4 at a temperature of about −88° F. with slight pressure reduction so that feed to turbine 7 is at about feed gas pressure. In passage through the turbine, the line 6 and column 9 gas pressure is reduced to about 195 p.s.i.g. and about −157° F., and for substantially 60% ethane and 98% propane and heavier hydrocarbon recovery through lines 26 and 31, column 9 is operated at a bottoms temperature of about 27° F. Liquid from gas-liquid separator 4 is fed through line 5 to column 9 at a temperature of about −135° F. and a pressure of about 195 p.s.i.g.

The column 9 overhead goes to compressor 16 through line 13 at about column pressure or somewhat below and a temperature of 70° F. and the compressor operates to elevate the stripped gas from a pressure of about 170 p.s.i.g. up to 295 p.s.i.g.

The column 9 bottoms is pumped from line 17 via line 19 to column 20 operating at about 290 p.s.i.g. The combined ethane-propane overhead product is condensed at a temperature of about 45° F. and a pressure of about 280 p.s.i.g. in condenser-reboiler 12 and delivered to accumulator 28 and is subsequently taken from the reflux pump discharge line 30. The column 20 bottoms liquid is withdrawn through line 23 at a temperature of about 280° F. and a pressure of about 290 p.s.i.g. and is delivered to subsequent use or process.

We claim:
1. The method of treating high pressure hydrocarbon feed gas having relatively high carbon dioxide content to product output products including a liquid product comprising liquid ethane substantially free of carbon dioxide and a gas product at low pressure comprising methane and carbon dioxide which includes:
   (a) expanding a precooled gaseous portion of said feed through a turbine to produce a mixture of gaseous hydrocarbon including methane and liquid hydrocarbon including liquid ethane, said mixture being at a temperature below −80° F.,
   (b) passing the mixture to a first separation column at a temperature below −80° F.,
   (c) separating essentially all the methane and gaseous carbon dioxide overhead from said first column as low pressure gas product, while maintaining non-gaseous carbon dioxide dissolved in said liquid hydrocarbon in said turbine and first column,
   (d) passing the ethane-containing liquid hydrocarbon bottoms substantially free of carbon dioxide from said first column to a second separation column,
   (e) separating ethane overhead in said second column and liquefying,
   (f) flowing said low pressure gas product in heat exchange relation with the feed gas to precool the feed gas, and
   (g) compressing a gas with the energy output of said turbine.

2. Method according to claim 1 including also passing ethane vapor from said second column into said first column at an intermediate level therein.

3. Method according to claim 1 including providing a pressure in said first column and turbine on said mixture to maintain solution of nongaseous carbon dioxide in said liquid hydrocarbon.

4. Method according to claim 3 in which said pressure is such that carbon dioxide is relatively more volatile than ethane.

5. Method according to claim 4 in which said pressure is between 100 and 600 p.s.i.g. and said mixture temperature is not lower than −180° F.

6. Method according to claim 1, including also separating a liquid portion from said precooled feed gas and introducing said portion into an intermediate level of said first separation column.

7. Method according to claim 1, including also heat exchanging said ethane overhead gas with bottoms liquid from said first column to liquefy said ethane gas and to reboil said first column.

8. Method according to claim 2, including also heat exchanging said ethane overhead gas with bottoms liquid from said first column to liquefy said ethane and to reboil said first column.

9. Method according to claim 3, including also heat exchanging said ethane overhead gas with bottoms liquid from said first column to liquefy said ethane gas and to reboil said first column.

10. Method according to claim 4, including also heat exchanging said ethane overhead gas with bottom liquid from said first column to liquefy said ethane gas and to reboil said first column.

11. Method according to claim 5, including also heat exchanging said ethane overhead gas with bottoms liquid from said first column to liquefy said ethane gas and to reboil said first column.

12. Method according to claim 6, including also heat exchanging said ethane overhead gas with bottoms liquid from said first column to liquefy said ethane gas and to reboil said first column.

13. Method according to claim 1, including also heat exchanging said ethane overhead gas with bottoms liquid from said first column to liquefy said ethane gas and refluxing said second column with a portion of heat exchanged ethane product.

14. Method according to claim 2, including also heat exchanging said ethane overhead gas with bottoms liquid from said first column to liquefy said ethane gas and refluxing said second column with a portion of heat exchanged ethane product.

15. Method according to claim 3, including also heat exchanging said ethane overhead gas with bottoms liquid from said first column to liquefy said ethane gas and refluxing said second column with a portion of heat exchanged ethane product.

16. Method according to claim 4, including also heat exchanging said ethane overhead gas with bottom liquid from said first column to liquefy said ethane gas and refluxing said second column with a portion of heat exchanged ethane product.

17. Method according to claim 5, including also heat exchanging said ethane overhead gas with bottoms liquid from said first column to liquefy said ethane gas and refluxing said second column with a portion of heat exchanged ethane product.

18. Method according to claim 6, including also heat exchanging said ethane overhead gas with bottoms liquid from said first column to liquefy said ethane gas and refluxing said second column with a portion of heat exchanged ethane product.

19. Method according to claim 1, including also separating propane hydrocarbon overhead from said second column and separating isobutane and higher hydrocarbons as bottoms from said second column.

20. Method according to claim 3, including also separating propane hydrocarbon overhead from said second column and separating isobutane and higher hydrocarbons as bottoms from said second column.

21. Method according to claim 4, including also separating propane hydrocarbon overhead from said second column and separating isobutane and higher hydrocarbons as bottoms from said second column.

22. Method according to claim 6 including also separating propane hydrocarbon overhead from said second column and separating isobutane and higher hydrocarbons as bottoms from said second column.

23. Method according to claim 1 including compressing the methane containing gas with said turbine energy output.

24. Method according to claim 1 including also compressing the feed gas with said turbine energy output.

25. Method according to claim 10 including also compressing the feed gas with said turbine energy output.

26. Method according to claim 1 in which said feed gas contains between about 0.1 and 15% carbon dioxide by volume and in which the mixture pressure and temperature are selected to provide a relative volatility of carbon dioxide to ethane in said first column above 1.0.

27. Method for obtaining ethane essentially free of methane and carbon dioxide from hydrocarbon feed gas containing at least about 0.1% by volume carbon dioxide which includes polytropically expanding the feed gas through a turbine to lower the temperature thereof to a value at which methane and carbon dioxide are relatively volatile and separable therefrom, but maintaining pressure on the expansion products at a value which inhibits icing separation of carbon dioxide from said products and which permits separation of substantially all of the carbon dioxide gas with said methane.

28. The method of treating high pressure hydrocarbon feed gas having undesirably high carbon dioxide content to produce output products including ethane substantially free of carbon dioxide and a gaseous product comprising methane and carbon dioxide which includes:
  (a) expanding a precooled gaseous portion of the feed through a turbine to produce a mixture of gaseous hydrocarbon and liquid hydrocarbon, said mixture being at a temperature below about $-80°$ F.,
  (b) passing the mixture to a separation column at a temperature below about $-80°$ F.,
  (c) separating substantially all of the gaseous methane and carbon dioxide overhead from said column, while maintaining nongaseous carbon dioxide dissolved in said liquid hydrocarbon in said turbine and said column,
  (d) separating ethane substantially free of carbon dioxide from said column, and
  (e) flowing said gaseous product in heat exchange relation with the feed gas to precool the feed gas.

29. Method according to claim 28 including providing a pressure in said column and turbine on said mixture to maintain solution of nongaseous carbon dioxide in said liquid hydrocarbon.

30. Method according to claim 28 in which said pressure is one at which carbon dioxide is relatively more volatile than ethane.

31. Method according to claim 28 including also separating a liquid portion from said precooled feed gas and introducing said portion into the intermediate portion of said separation column.

32. Method according to claim 28, in which ethane separation includes passing ethane containing liquid hydrocarbons from the first column to a second separating column.

33. Method according to claim 29, in which ethane separation includes passing ethane containing liquid hydrocarbons from the first column to a second separating column.

34. Method according to claim 30, in which ethane separation includes passing ethane containing liquid hydrocarbons from the first column to a second separating column.

35. Method according to claim 31, in which ethane separation includes passing ethane containing liquid hydrocarbons from the first column to a second separating column.

36. Method according to claim 27, including compressing a gas with the energy output of said turbine.

37. Method according to claim 28, including compressing a gas with the energy output of said turbine.

38. Method according to claim 29, including compressing a gas with energy output of said turbine.

39. Method according to claim 30, including compressing a gas with the energy output of said turbine.

References Cited

UNITED STATES PATENTS

| | | | |
|---|---|---|---|
| 2,760,356 | 8/1956 | Sixsmith | 62—38 |
| 3,349,571 | 10/1967 | Nebgen | 62—23 |
| 3,359,743 | 12/1967 | Napoli | 62—38 |
| 3,397,138 | 8/1968 | Bacon | 208—340 |
| 3,433,026 | 3/1969 | Swearingen | 62—38 |

HERBERT LEVINE, Primary Examiner

U.S. Cl. X.R.

55—68; 62—23, 38